(12) United States Patent
Salo

(10) Patent No.: US 12,736,470 B2
(45) Date of Patent: Sep. 15, 2026

(54) OPTICAL PROCESS MONITORING DEVICE

(71) Applicant: KXS Technologies Oy, Vantaa (FI)

(72) Inventor: Harri Salo, Vantaa (FI)

(73) Assignee: KXS TECHNOLOGIES OY, Espoo (FI)

( * ) Notice: Subject to any disclaimer, the term of this patent is extended or adjusted under 35 U.S.C. 154(b) by 117 days.

(21) Appl. No.: 18/786,071

(22) Filed: Jul. 26, 2024

(65) Prior Publication Data

US 2025/0208037 A1 Jun. 26, 2025

(30) Foreign Application Priority Data

Jul. 27, 2023 (FI) .................................. U20234084

(51) Int. Cl.
*G01N 21/41* (2006.01)
*G02B 7/02* (2021.01)

(52) U.S. Cl.
CPC ......... *G01N 21/4133* (2013.01); *G02B 7/022* (2013.01); *G01N 2201/021* (2013.01); *G01N 2201/0683* (2013.01)

(58) Field of Classification Search
CPC ......... G01N 21/4133; G01N 2201/021; G01N 2201/0683; G01N 21/0303; G02B 7/022; G02B 5/04
USPC ........................................................ 356/128
See application file for complete search history.

(56) References Cited

U.S. PATENT DOCUMENTS 9,464,981 B2 * 10/2016 Gibbons .................. C12Q 1/42
2002/0012930 A1 * 1/2002 Rothberg ........... G01N 21/6452 435/8
2006/0216200 A1 * 9/2006 Nagatomo ......... G01N 21/4133 422/68.1
2009/0191096 A1 * 7/2009 Yokomine ......... B01L 3/502715 422/68.1
2010/0196207 A1 * 8/2010 Steinmiller ....... B01L 3/502707 422/82.11
2012/0021525 A1 * 1/2012 Fehr .................. G01N 21/6456 250/226
2021/0149361 A1 * 5/2021 Jungbauer ............. G05B 17/02

* cited by examiner

*Primary Examiner* — Md M Rahman
(74) *Attorney, Agent, or Firm* — NIXON & VANDERHYE

(57) ABSTRACT

Present disclosure concerns embodiments of a fastening arrangement for an optical element (1), (8), (S), (P), (A) of an optical device, such as a refractometer for example, said optical element (1), (8), (S), (P), (A) having a three-point attachment, in addition to at least one fastening point on the inner frame (3) of the optical device (100), as implemented by means of a claw coupling (5) provided thereon to press the optical element (1), (8), (S), (P), (A) of said optical device (100), (100P), at its lateral face parallel to the optical axis, against said at least one fastening point in the three-point attachment. The disclosure concerns also a refractometer that comprises such a fastening arrangement, to be used for example in a stereochemical process to determine the concentration of a stereomer process substance.

11 Claims, 3 Drawing Sheets

100
Out
E
S
diff
orif
orif
f2
f1
2
2
M
1
8
1
7
A

100P
S
diff
P
orif
f2
f1
P
2
2
M
1
8
1
7
A

OPTICAL PROCESS MONITORING DEVICE

FIELD OF THE INVENTION

Generally, the invention relates to an optical process monitoring device. More specifically, the invention relates to a structure for fastening optical elements of an optical device and to the use of the structure in the process monitoring device.

BACKGROUND

Industrial processes employing organic substances, in particular, can be vulnerable to external stimulants which, in the worst case, directly affect the process, the substances present therein or the main reaction taking place in the process, and/or, may direct the yield of the desired product obtained as a result of the main reaction, from the main reaction towards an unfavorable composition, through a side reaction.

Therefore, it is preferable to use, in both biochemical processes and pharmacological processes, contact-free technologies to get process-specific information on the substance flows of the process and/or on how the process taking place in the reactor is proceeding, including any side reactions and the product and/or yield thereof. In addition, taking samples may pose a risk for to the hygiene security of the process, and so-called offline tests, such as a laboratory analysis, may take a long time, thus providing dated information when the results are ready.

One of such technologies is based on an optical measurement by using a refractometer known per se, wherein substance concentrations of a process solution can be derived from light reflected and refracted by an interface between the process solution and a tip prism of the refractometer, and emitted by a source of light provided in the refractometer, when the refractive index of the process solution is measured and it is known that it depends on the concentration of the solution, and, thus, can be determined by means of the refractometer, allowing any changes in the concentrations to be monitored while the process is ongoing, without interfering the process itself.

Measuring devices which can be connected to processes are standardized regarding the process interface. On one hand, a standardized interface like this can often be large in size, in a standard implementation, but, on the other hand, the space available in proximity to the process vessel, or, to the flow line feeding it, can be fairly restricted, at that exact desired point of the process. Besides, large apparatuses may also cause, in the reaction vessel/the flow line, due to their large process fittings, whirling, turbulence, which, in turn, may change the course of the process and, further, cause formation or accumulation of particles at undesired points of the apparatus, on the reactor vessel/flow line side, or even directly on the optical surfaces of the measuring device.

A commonly used process fitting in pharmaceutical industry is the 1 inch Ingold fitting which has gained a stabilized position as a fitting for connecting a measuring device to fermentation vessels. As implied by its name, the fitting is 25 mm in diameter, and, the O ring used for sealing makes the diameter even smaller, leaving a cross-section less than 20 mm for optics.

Optical devices, such as refractometers, would otherwise be quite suitable for the above-described contact-free process monitoring which, in other words, does not change the reaction but which is hygienic, but, although standardized apparatus connections do exist, compatible fitting of optics to a standardized connection on the apparatus, at a desired point of the process, in a reliable and mating manner, is problematic, especially in tight spaces.

SUMMARY OF THE INVENTION

The present invention aims at providing a solution eliminating the above-mentioned drawbacks, or, at least alleviating the effects thereof. In particular, the invention aims at solving how to fasten the optical elements of an optical process monitoring device, such as of a refractometer, in a space-saving manner at the measuring end of the device, allowing the process monitoring device equipped with such optics also to be utilized in tight spaces and for smaller standardized connections, for the purpose of monitoring sensitive biochemical and pharmaceutical processes.

In the description of the embodiments of the present invention, the term “optical” and optical radiation refer to electromagnetic radiation having wavelengths from the infrared range to the wavelengths of visible light and, further, including the ultraviolet range. More specifically, light refers to the electromagnetic radiation in the wavelength range of visible light as well as to said wavelengths of optical radiation.

The objectives of the invention are achieved by a structure for fastening an optical element as defined in the independent claim 1.

The optical structure according to the invention is characterized in what is set forth in the characterizing part of claim 1.

A fastening arrangement for an optical element according to an embodiment of the invention comprises one or more optical elements which can be one of the following: a lens or some other waveguide, such as an optical fiber, a source of light, a diffuser, an orifice body defining an orifice for light confinement, a polarizer, a polarization analyzer, a condenser lens and an analyzer, such as a line analyzer, and/or a camera used as an analyzer.

A fastening arrangement according to an embodiment of the invention comprises said claw coupling provided between the inner surface of the outer frame of the optical device and said optical element.

A fastening arrangement according to an embodiment of the invention comprises, between the inner surface of the outer frame of the optical device and said optical element, a clamping collar attached to the inner frame of the optical device so as to clamp the claw coupling (5), said clamping collar contacting the inner surface of said outer frame in cylinder symmetry, alternatively or additionally, to result in clamping of the fastening screw of the claw coupling.

A fastening arrangement according to an embodiment of the invention comprises, on its claw coupling, a surface made of an elastic material for contact with the optical element on the installing surface of the optical element. The fastening arrangement may also have a formation recess at the installing point of the optical element on the inner frame.

A refractometer using an optical structure according to the invention, as an optical device, is characterized in what is set forth in the characterizing part of the refractometer claim.

A refractometer according to the invention has fastening means for fastening the refractometer to a process fitting which is one of the following: a 25 mm process fitting or a 1" (inch) process fitting.

A refractometer according to an embodiment of the invention has one or more polarizers on its optical line, wherein at least one polarizer is provided in the structure of the refractometer to detect the polarization of light arriving from the prism to the analyzer, on an optical line between the analyzer and the prism, preferably between the condenser lens and the analyzer, or the prism and the condenser lens.

A refractometer according to the invention has fastening means for fastening the refractometer which are compatible with the Ingold process standard for fastening a refractometer.

A refractometer arrangement according to the invention, including a refractometer according to the invention, is characterized in what is set forth in the characterizing part of the refractometer arrangement claim.

According to an embodiment of the invention, the refractometer and/or the refractometer arrangement of the invention can be used to determine the concentration of a stereomer process substance in a stereochemical process. According to an embodiment variant, such use concerns determining the concentration of a process substance in an Ingold process standard.

Other preferable embodiments of the invention are set forth in the dependent claims.

In an optical structure according to an embodiment of the present invention, an optical element of the optical device is mounted in an operational location to convey optical radiation on a radiation line, by means of a claw coupling immovably pressing the optical element against the axial straight protective casing of the optical device, or, against a similar formation. The surfaces of the claw coupling can be made of an elastic material in order to consider any effects of thermal expansion in the attachment. Where appropriate, the claw coupling can be made of metal, ceramic, plastic or any combination thereof, in order to adapt the pressing force directed to the optical element in a temperature-regulated manner, for the purpose of providing elasticity in the attachment to the rest of the structure.

Therefore, an optical structure according to an embodiment of the present invention has the beneficial feature that, by putting together the optical elements of the optical radiation transfer line into a radiation transfer line, space can be saved in a direction perpendicular to the longitudinal axis of the optical device, allowing the optical device to be made narrower in diameter in the cross-sectional direction than by fastening the optical element in some other way, i.e. the optical device can be made considerably thinner in diameter than any prior-art devices, allowing an optical device using an optical structure according to the invention, such as a reflectometer, also to be connected to standardized fittings where the connection differs from traditional standardized reflectometer connections, or, where no standard exists for the process for connecting a refractometer to the process but some other connection according to an applicable process industry standard would be possible, wherein biochemical and/or pharmacological processes, for example, would clearly benefit from contact-free process substance monitoring performed by means of a refractometer, for example.

In this application, the term “a number of” refers to any positive integer starting from one (1), such as one, two or three etc.

Correspondingly, the term “a plurality of” refers to a whole including at least one individual entity of the plurality.

The term “comprise” is used as an open expression wherein any structure or part, for example, with a first object comprising a second object, does not exclude the possibility of other objects existing in said first object.

BRIEF DESCRIPTION OF THE FIGURES

In the following, preferred embodiments of the invention will be described with reference to the accompanying drawings depicting exemplary embodiments of the invention

DETAILED DESCRIPTION OF EXEMPLARY EMBODIMENTS OF THE INVENTION

Figures 1, 2:
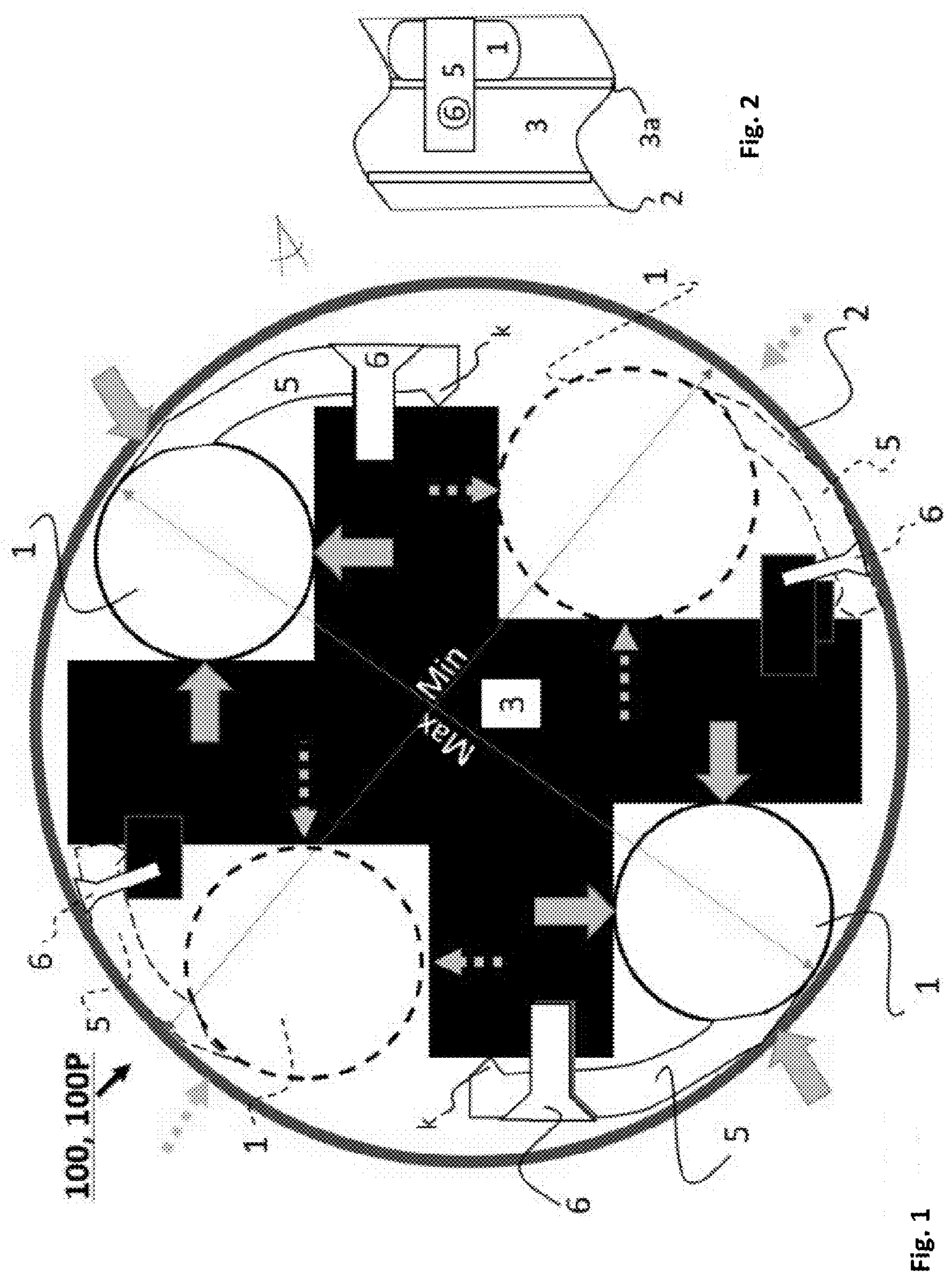
FIG. 1 shows an exemplary optical structure according to an embodiment of the present invention.
FIG. 2 shows the example of FIG. 1, as seen from a perpendicular cross-sectional plane.
Figures 3, 3P:
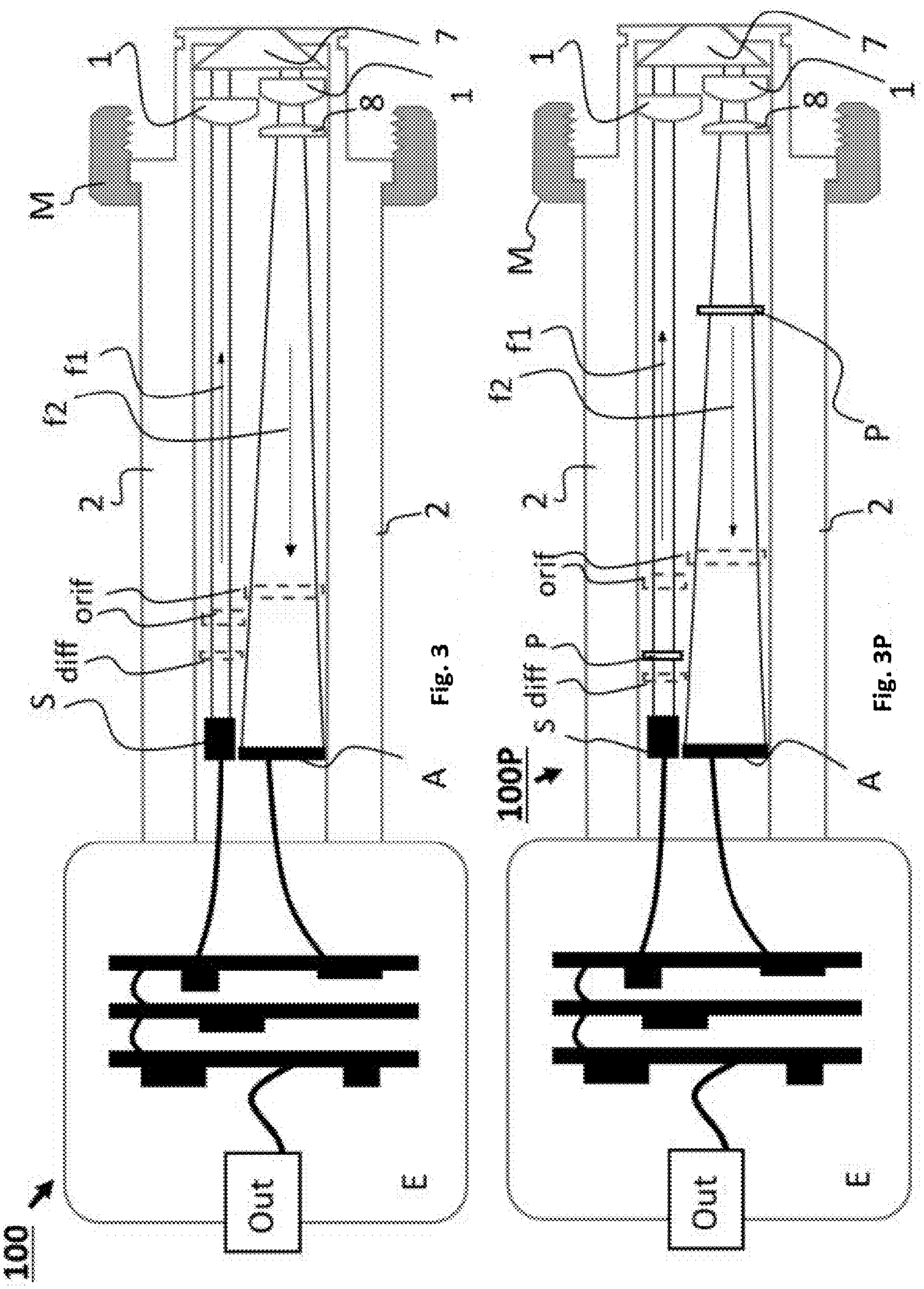
FIG. 3 shows an example of a refractometer using an optical structure according to an embodiment of the present invention.
FIG. 3P shows the example of FIG. 3 of an embodiment of the invention, also including a polarizer arrangement.

FIG. 1 illustrates an optical structure according to an embodiment of the invention as an example for fastening an optical element, a lens 1, between the shell 2 and the wall 4 of the inner space 3 of the refractometer by means of a claw coupling 5. The figures illustrate a cross-section before the prism 7 (FIGS. 3 and 3P). The lens 1 also illustrates, at the same time, an optical line (f1, f2 in FIGS. 3 and 3P) to which it belongs and along which the light of the optical device travels from the source of light to the analyzer A via the prism (FIGS. 3 and 3P), when the optical device is operating. The optical line (f1, f2) is illustrated in FIGS. 3 and 3P. In the examples of the embodiments of the invention shown in FIGS. 1 to 3P, the optical line f1, f2 is implemented from the source of light S to the prism 7 (the section f1 of the optical line) and from the prism 7 to the analyzer A (the section f2 of the optical line). According to an embodiment, the prism 7, the source of light S as well as the analyzer A form part of the optical line, in the section of the line illustrated in FIGS. 3 and 3P.

Although the example shown in FIG. 1 defines the optical element as a lens 1, it is also possible to mount a source of light S, a diffuser diff, an orifice body orif and/or an analyzer A, respectively, as an optical element, in place on the optical line, just like the lens 1 by means of the claw coupling 5, in the optical device illustrated in cross-section in the embodiments shown in FIGS. 3 and 3P.

Arrows are used to denote fastening/supporting points to the inner wall 3, each lens 1 being, in the cross-sectional view, attached/supported at three points, at the attachment/supporting points denoted by the arrows, in order to form an optical radiation transfer line. Hence, according to an embodiment, the claw coupling 5 is made of materials having elastic properties on the surface abutting the optical element 1, which in the given example is a lens 1, the material selected for the claw coupling 5 adapting it to the temperature of the operation environment of the optical device since the elastic properties of the gripping surface of the claw coupling 5, either as a result of its material, or, of its functional elastic spring structure, or of a combination thereof, keep the lens 1 in a position where it is put on the optical line which is the optical radiation transfer line. In the exemplary embodiment shown in FIG. 1, the claw coupling 5 for holding the lens 1 is clamped, at the arm section of the claw coupling 5 (the arm section extends from the end of the claw coupling to the contact surface of the optical element) by a screw, the swinging tip k acting as a supporting point by means of the frame shape constituting the inner wall 3 of the refractometer, as the claw coupling at the other end of its arm (the pressing end that presses the optical element), as shown in FIG. 1, presses the optical element 1, which in the example is a lens 1, in place. Similarly, the other optical elements in FIGS. 3 and 3P can be fixed in place by means of claw couplings 5.

According to an embodiment, the lens 1 (or some other optical element, such as a source of light S, an analyzer A, a polarizer P as well as a waveguide, where appropriate, on the optical line f1, f2) can be mounted in place in the installing step, by means of a formation recess made during the manufacture of the frame/inner wall 3 and following the shape of the optical element. This allows the supporting points denoted by the arrows to be always, while manufacturing refractometers according to the invention, positioned at the same location on the optical device, however, with the optical elements, where appropriate, pressed by the claw coupling 5, in accordance with the embodiment, at the location of the optical elements on the optical line.

The formation recess can be a formation recess made in the inner wall/frame 3 of the refractometer. It is also possible to use a formation recess at both three-point attachments on the inner wall/frame, in order to create two spot-like attachments in a perpendicular direction to the optical axis of the elongated optical device. Thus, when the device is assembled during its manufacture, it is easier the mount the lens 1 or the other optical element in place, allowing mechanical stability to be achieved, even by means of a small recess, against crawling caused by vibration. According to a variant, the surfaces of the formation recesses abutting the optical element can also be coated in an elastic material, where appropriate, in order to maximize the grip of the attachment.

Figures 4, 5, 6:
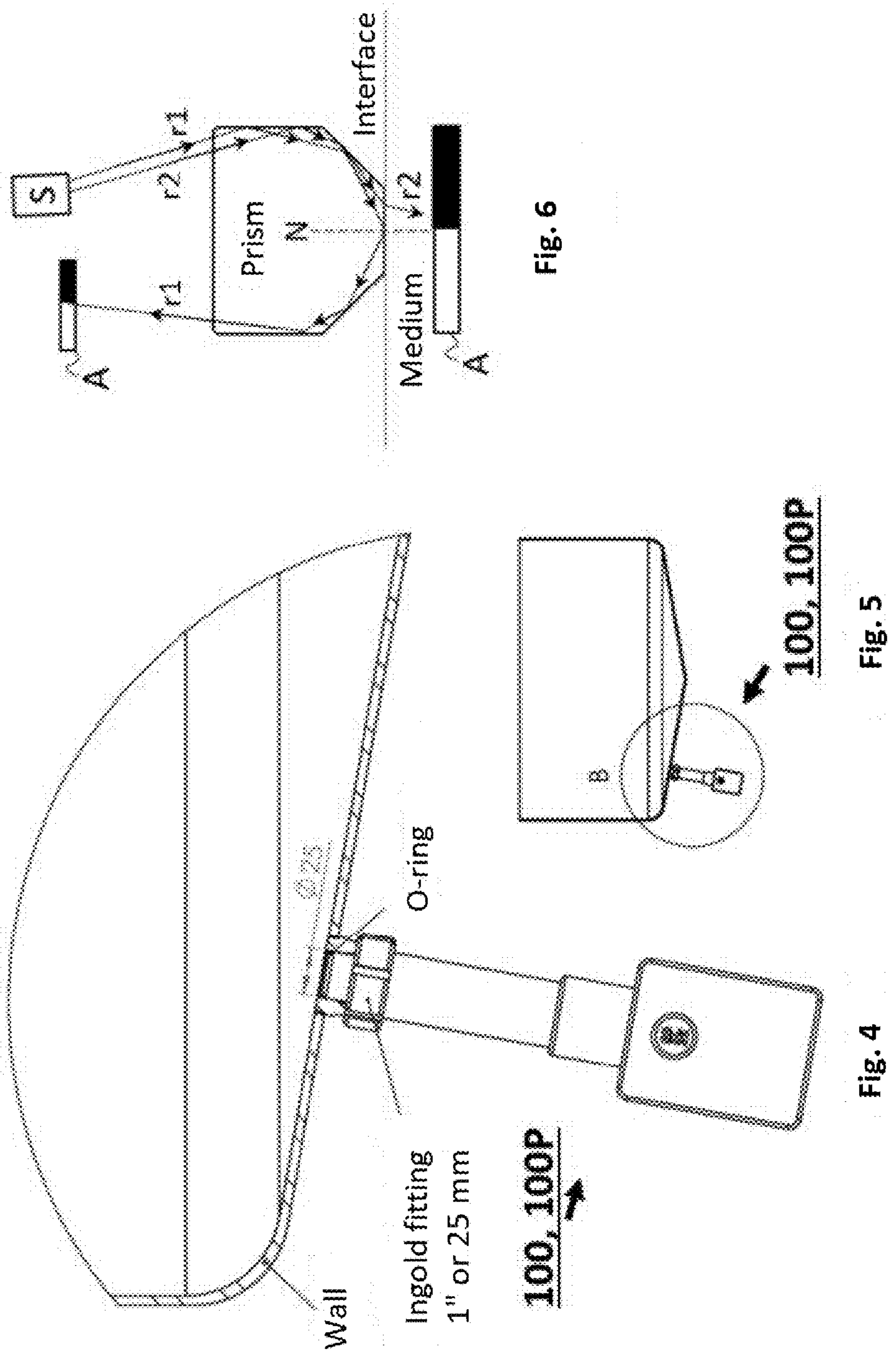
FIG. 4 shows another example of a refractometer using an optical structure according to an embodiment of the present invention.
FIG. 5 shows how a refractometer according to an embodiment of the present invention is used for process monitoring.
FIG. 6 is a generic exemplary schematic view of the operation of a refractometer.

In the example of FIG. 1, two lenses 1 are presented by continuous line circles (without exclusively limiting the shape of the applicable lenses to the one presented herein), wherein the arriving light is directed, through the first lens, to the prism 7 of the refractometer (FIGS. 3, 3P) along the optical line, the section f1 thereof, which can be implemented with a solid waveguide, with air or some other gas or liquid or a combination of these, where appropriate. Thus, the light arriving from the source of light S (FIG. 3, 3P) to the prism 7 of the refractometer is subjected to total reflection at a given point of the prism 7 (as schematically illustrated in FIG. 6), at an angle determined by the ratio of the refractive indices, allowing the light radiation returning from the prism to be directed along a second optical line, the section f2 thereof, back to the analyzer A of the refractometer, to a reading head, such as a line analyzer A, thus becoming possible, based on the light arriving to the analyzer, to determine at which point on the optical surface of the line analyzer the light subjected to total reflection in the prism forms a light interface on the line analyzer (A), this point then revealing the ratio of the refractive indices of the interface of the prism and the solution. As the refractive index of the prism (material) is known in advance, and the refractive index of the solution is also known, the concentration of the solution can be derived/calculated by means of the refractive indices.

According to an alternative embodiment, a digital camera can be used as the line analyzer (as the analyzer A), wherein the optical light arriving from the prism is directed to the optical surface thereof for image formation, in order to define, on the optical surface, an illuminated and dark site border according to the total reflection, and, thus, the refractive index and the concentration of the solution.

An alternative additional structure is also illustrated in FIG. 1 by a dashed-line pattern, also including, alternatively, a second similar optical line f1, f2 and an optical element 1 thereof coupled by a claw coupling 5, similarly to the exemplary embodiment drawn by a continuous line. The wall/frame 3 of the inner space (and, thus, the volume defined by it, with the walls 3*a*) is shown as a solid dark area. The fastener 6 is illustrated as a countersunk head screw to give an example of the attachment to the wall/frame of the inner space 3. Although the optical elements (lenses 1 in FIG. 1) provided on the arrival and return side of the second optical line designated by the continuous line are shown to be fastened by screws 6, a person skilled in the art is also capable of fastening, based on the embodiments of the invention, the optical elements of the second optical line designated by a dashed-line to the wall/frame of the inner space, by using suitable fastening means not limited to countersunk head screws. The fastening means may also differ in orientation and size from the embodiment illustrated by the continuous line.

FIG. 2 illustrates, as seen from a cross-sectional plane of FIG. 1, how to fasten an optical element shown therein, a lens 1 (also a lens 8, a polarizer 8, an analyzer A, a diffuser diff, an orifice body, a source of light S, a waveguide on the optical line or a section thereof f1, f2, where appropriate) by means a claw coupling 5 and a screw 6, in accordance with the cross-section of FIG. 1, but seen from another direction, with the optical axis of the lens parallel to the plane of the figure but with the clamping direction perpendicular to the optical axis of the optical element, and, at the same time, in cylinder symmetry, in the radial direction of the cylindrical refractometer structure, by utilizing the wall 3*a* of the inner space 3 to enhance the fastening by means of a supporting point. The inner space 3 can be hollow or filled with any suitable solid material.

FIG. 3 illustrates a refractometer 100 according to an embodiment of the invention. The references in the longitudinal cross-section are similar to the references in FIG. 1, where appropriate, the lens 1 being a lens 1 on the optical line f1 on the light source S side. The lens 8 is a lens on the optical line section f2 on the return side of the light arriving from the prism 7. The reference numeral 7 refers to the prism of the refractometer at the tip of the refractometer, intended to be immersed into the solution interface to create an optical interface between the prism 7 and the process solution. A condenser lens 8 is shown on the optical line f2 of the return side, directing the optical radiation arriving from the prism 7, such as light in the example shown in the figure, to the analyzer A, which, according to an embodiment, is a line analyzer or a camera, without unnecessarily being restricted solely to said alternatives. The section E of the refractometer illustrates electronics and connections, this section E containing power sources, intended, for example, for energy supply to the source of light S, as well as electronics for the operation of the analyzer A, including also processing location data provided by a signal. The section E may also contain analog-to-digital converters as well as transmitting means for forwarding a signal/data obtained from the analyzer. "Out" in FIG. 3 refers to a signal output which can be either analog or digital, implemented, where appropriate, in a wired or wireless manner, alternatively also optically. As examples of wireless implementations can be mentioned WiFI or Bluetooth implementations based on a suitable radio protocol, to allow the measurement data of the refractometer to be utilized outside the section E of the electronics, through the output Out. The optical implementation can be based on a fiber, or, as an example, on a transmitter emitting radiation in the infrared or some other optical range.

The reference M refers to a mechanical attachment by a nut M, for example, which is compatible to the standardized connection of the process to be monitored, such as suitable for a 25 mm or 1" standardized Ingold process fitting. If the source of light S of the refractometer is of a type requiring temperature compensation, it is possible to provide a temperature sensor in proximity to the prism 7, or, on the prism 7, at a point that is not used for reflecting the primary light arriving to the prism (7) (from the section f1 of the optical line) or the outgoing secondary light (to the section f2 of the optical line) on the optical line (the source of light S—the primary line (f1) to the prism 7—the secondary line (f2) from the prism to the analyzer (A). The dashed lines illustrate examples of alternative optical components according to the embodiments. Their installation locations shall not exclusively be limited to the optical line section mentioned in the example.

The references of the refractometer (100P) used in FIG. 3P are similar to the references used in FIG. 3, with an addition of a polarizer P to the optical line f1, f2, both to the section f1 of the light source side and to the section f2 of the return side, they also being, where appropriate, alternative, regarding at which one of the locations they are provided. Thus, the refractometer 100P of FIG. 3P has at least one polarizer P, situated either on the light source side f1 of the optical line, before the prism 7, or, on the return path f2, after the condenser lens 8 (or before it), in the light propagation direction, before the line analyzer A. According to an embodiment, the polarizer P can be integrated with the source of light S (the source of light S can also merely transmit light polarized in a specific manner), with the lens 1 on the light source side, with the condenser lens 8 on either side thereof, or, with the line analyzer A. The polarizer P can also be placed on the light source side f1 and on the return side f2 of the optical line f1, f2, with the intention that they serve as an actual polarizer and as a polarization analyzer, respectively. The polarizer P can produce linear polarized light, circular polarized light or elliptical polarized light/operate as a polarization analyzer to detect polarization.

According to an embodiment, the optical line f1, f2 of the refractometer 100, 100P denoted by a dashed line in FIG. 1 can be the optical line of the refractometer variant of the embodiment shown in FIG. 3P. According to another embodiment variant, the optical lines of the exemplary embodiment illustrated in FIG. 1 by both continuous lines and dashed lines may each have a polarizer in the embodiment illustrated in FIG. 3P. In this embodiment, the polarizers P are preferably adapted to detect light polarized in different ways.

According to an embodiment, the section f1 of the optical line comprises, as a part thereof, a diffuser (diff in the examples of FIGS. 3 and 3P) after the source of light, but before the prism 7, to diffuse the light. The diffuser can be a separate component, or, alternatively, integrated with the source of light S. According to an embodiment, the optical line may also comprise an orifice body implemented by a separate orifice, the orifice being adapted to confine the light in accordance with the location of the orifice on the optical line f1, f2, so as to confine diffuse radiation, for example, to a desired section of the optical line extending to the prism (in the section f1 between the source of light and the prism) and extending from the prism 7 to the analyzer (in the section f2 between the prism 7 and the analyzer A). A person skilled in the art is capable of determining a location for the orifice body on the optical line f1, f2, based on the installation locations of the other parts of the optical line, in each particular embodiment. The dashed lines illustrate examples of alternative optical components according to different embodiments. Their installation locations shall not exclusively be limited to the optical line section mentioned in the example.

FIGS. 4 and 5 illustrate a refractometer 100, 100P according to an exemplary embodiment of the invention (such as according to the examples illustrated by FIGS. 1-3P) fastened to a reaction vessel by a standardized connection (M) used in the process, for the purpose of monitoring the process in the reaction vessel by detecting the refractive index of the solution in vessel by means of the refractometer 100, 100P, as well as any changes in the refractive index, in order to determine and follow the concentration of the solution. Based on some embodiments of the invention, it is also possible to detect changes in the polarization of the light traveling through the interface between the process and the prism of the refractometer by means of a polarizer, allowing the refractometer according to the embodiment to be used, where appropriate, for monitoring concentrations in processes using/producing stereochemical substances, with the result that the changes in the polarization can be detected by means of the polarizer and the information provided by the changes can be used as a part/support of the process information.

This allows, where appropriate, data on the concentrations of stereomer substances involved in the process to be obtained by means of the refractometer equipped with the polarizer, especially when the stereomers have a mutually dissimilar activity detectable in the form of polarization, in addition to other concentration data. Thus, polarization provides, where appropriate, a way of accessing stereocenter-based information on CIP (Cahn-Ingold-Prelog) priorities in the molecule structure.

FIG. 6 illustrates schematically how light travels in a refractometer, without considering how high the refractive indices are compared to each other on the different sides of the interface. The light beams r1 and r1 emitted by a source of radiation S are reflected by the lateral surfaces of the prism, as shown by the arrows, the light beam r2 arriving to the interface between the prism and the medium, due to its angle of arrival with respect to the normal N of the surface, is refracted to the medium, whereas the light beam r1, due to its angle of arrival with respect to the interface, travels onwards by being reflected by the interface, and reaches, through mirror surfaces, the line analyzer A where r1 hits a point that is detected as an illuminated spot, whereas the light beams having steeper angles of arrival (r2) penetrate into the medium and are detected not as an illuminated spot but as a dark spot on the analyzer A. Thus, the interface between the illuminated and the dark spot on the analyzer A corresponds to the total reflection critical angle, and, therefore, to the ratio between the refractive indices of the prism and the medium.

The invention claimed is:

1. A refractometer acting as an optical device, the refractometer comprising:

a plurality of optical elements comprising one or more lenses, a source of light, an analyzer, and a prism at a tip of said refractometer, the prism having an optical interface, at the tip of the refractometer, with a fluid outside the refractometer, and one or more optical lines provided by said optical elements to direct optical radiation from the source of light to said prism, through the one or more lenses in a total reflection angle, and, therefrom, to the optical interface of said prism at the tip of the refractometer, and, therefrom, to the analyzer, through at least one or more of the one or more lenses; and a fastening arrangement configured to fasten at least one of said optical elements to the refractometer, the at least one optical element having a three-point attachment and at least one fastening point on an inner frame of the refractometer, the fastening arrangement comprising a claw coupling configured to press the at least one optical element on the inner frame of the refractometer, at a lateral face of the at least one optical element parallel to an optical axis, against said at least one fastening point in the three-point attachment.

2. The refractometer as defined in claim 1, wherein the optical elements further comprise one or more of a waveguide, a polarizer, a condenser lens, a diffuser, an orifice, and a camera.

3. The refractometer as defined in claim 1, wherein said claw coupling is provided between an inner surface of an outer frame of the refractometer and the at least one optical element.

4. The refractometer as defined in claim 1, further comprising a clamping collar is provided between an inner surface of an outer frame of the refractometer and the at least one optical element, attached to the inner frame of the refractometer to clamp the claw coupling, said clamping collar contacting the inner surface of said outer frame in cylinder symmetry, alternatively or additionally, to result in clamping of a fastening screw of the claw coupling.

5. The refractometer as defined in claim 1, characterized in that its claw coupling (5) has a surface made of an elastic material for contact with the optical element (1), (8), (S), (P), (A) on the installing surface of the optical element.

6. The refractometer as defined in claim 1, further comprising a fastener configured to fasten the refractometer to a process fitting which is one of a 25 mm process fitting and a 1" process fitting.

7. The refractometer as defined in claim 1, further comprising one or more polarizers on one or more optical lines at least one of the one or more polarizers is configured to detect a polarization of light arriving from the prism to the analyzer, on an optical line of the one or more optical lines between the analyzer and the prism, between one or more of: (i) a condenser lens of the one or more lenses and the analyzer and (ii) the prism and the condenser lens.

8. The refractometer as defined in claim 1, wherein the fastening arrangement is compatible with the Ingold process standard.

9. A refractometer arrangement comprising:

one or more refractometers as defined in claim 1, at least one of the one or more refractometers comprising a polarizer.

10. A method comprising:

determining, by the refractometer according to claim 1, a concentration of a stereomer process substance.

11. A method comprising:

determining, by the refractometer as defined in claim 1, a concentration of a process substance in an Ingold process standard.

* * * * *